(12) United States Patent
Sigg et al.

(10) Patent No.: US 8,718,627 B1
(45) Date of Patent: May 6, 2014

(54) METHOD OF TRANSMITTING REVERSE LINK SIGNALS FROM MULTIPLE MOBILE STATIONS TO IMPROVE RECEPTION QUALITY

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 229 days.

(21) Appl. No.: 12/900,723

(22) Filed: Oct. 8, 2010

(51) Int. Cl.
*H04M 3/42* (2006.01)
*H04M 11/00* (2006.01)
*H04M 1/00* (2006.01)

(52) U.S. Cl.
USPC .................... 455/417; 455/421; 455/553.1

(58) Field of Classification Search
CPC ........................................................ H04M 3/54
USPC ......... 455/450, 447, 452.2, 456.2, 11.1, 13.1, 455/16, 41.1, 41.2, 101, 417; 370/225–228, 370/242–248, 274, 279, 338
See application file for complete search history.

(56) References Cited

U.S. PATENT DOCUMENTS

| | | | |
|---|---|---|---|
| 6,842,446 B2 | 1/2005 | Everson et al. | |
| 7,058,421 B2 | 6/2006 | Ngai et al. | |
| 7,248,875 B2 | 7/2007 | Schreuder et al. | |
| 2002/0187746 A1* | 12/2002 | Cheng et al. | 455/11.1 |
| 2005/0073975 A1 | 4/2005 | Chen et al. | |
| 2007/0135151 A1* | 6/2007 | Dendy | 455/517 |
| 2008/0056199 A1* | 3/2008 | Park et al. | 370/332 |
| 2010/0317284 A1* | 12/2010 | Charbit et al. | 455/7 |

OTHER PUBLICATIONS

Vijay K. Garg, "IS-95 CDMA and cdma2000," Prentice Hall PTR, 2000, pp. 57-78.

* cited by examiner

*Primary Examiner* — Huy C Ho

(57) ABSTRACT

A primary mobile station engaged in a communication session via a radio access network (RAN) may receive forward link communications over a forward link channel and transmit reverse link communications over a reverse link channel. If the quality of the communication session degrades, the primary mobile station may involve a secondary mobile station by establishing a short-range wireless communication link with the secondary mobile station, e.g., using Bluetooth™, IEEE 802.11, or other wireless communication protocol. The primary mobile station may then transmit reverse link communications to the RAN over the reverse link channel and also transmit the reverse link communications to the secondary mobile station, via the short-range wireless communication link, for transmission to the RAN. The RAN may receive the reverse link communications from the primary and secondary mobile stations as two distinct reverse link signals, which the RAN may combine together to achieve a diversity gain.

11 Claims, 4 Drawing Sheets

METHOD OF TRANSMITTING REVERSE LINK SIGNALS FROM MULTIPLE MOBILE STATIONS TO IMPROVE RECEPTION QUALITY

BACKGROUND

In wireless telecommunications systems, a radio receiver will often receive radio signals that have propagated from a transmitter over multiple different paths. This may occur, for example, because of reflections and/or scattering by buildings or other obstructions. The different propagation paths from the transmitter to the receiver may have different path lengths. As a result, radio signals that have propagated over different paths may have different phases at the receiver and may interfere with one another.

In spread spectrum systems, the potential for interference between radio signals propagating over different paths is minimized because a pseudorandom code sequence is imposed on the radio signal transmitted from the transmitter. The pseudorandom code sequence has the property that time-shifted versions of itself are largely uncorrelated. As a result, there will be little or no interference between spread spectrum radio signals that reach a receiver over different paths with different time-shifts. At the receiver, each signal component in a multipath radio signal can be separately resolved by correlating the signal component with a corresponding time-shifted version of the pseudorandom code sequence.

In spread spectrum systems, the receiver is typically a RAKE receiver that is able to separately resolve individual signal components of a multipath radio signal simultaneously. The multiple signal components that are separately resolved may then be combined to achieve a diversity gain. In combining the multiple signal components, each component could be weighted equally (equal-gain combining) or different components could be weighted differently (maximum ratio combining).

The block diagram of a RAKE receiver is often drawn to resemble a garden rake (hence the name). Each "finger" of the rake includes a correlator that is able to resolve a signal having a pseudorandom code sequence with a particular time-shift. The RAKE receiver in a typical mobile station may have three fingers, so as to be able to simultaneously resolve three different signals with three different time-shifts. The RAKE receiver in a typical base station may have four or more fingers.

Cellular wireless networks that use spread spectrum signals are typically configured so that each sector transmits signals using the same pseudorandom code sequence but with different time offsets. This enables the network to transmit a signal to a mobile station through two or more sectors. The mobile station's RAKE receiver may receive the signals from the different sectors simultaneously and combine them together to achieve a diversity gain. Thus, the different fingers of a mobile station's RAKE receiver may be used to simultaneously receive radio signals propagating over different paths from the same base station or to simultaneously receive radio signals from different base stations.

OVERVIEW

In a first principal aspect, an exemplary embodiment provides a method involving a primary mobile station and at least one secondary mobile station. In accordance with the method, the primary mobile station engages in a communication session via a radio access network (RAN), wherein the primary mobile station uses a forward link channel to receive communications from the RAN and uses a reverse link channel to transmit communications to the RAN. In response to a degradation in quality of the communication session, the primary mobile station establishes at least one wireless communication link with at least one secondary mobile station. The primary mobile station continues the communication session using the at least one secondary mobile station, wherein continuing the communication session using the at least one secondary mobile station comprises the primary mobile station transmitting reverse link communications to the RAN over the reverse link channel and also transmitting the reverse link communications to the at least one secondary mobile station over the at least one wireless communication link, wherein the at least one secondary mobile station is configured to transmit the reverse link communications to the RAN.

In a second principal aspect, an exemplary embodiment provides a method for a base station engaged in a communication session. The base station receives a first reverse link signal from a primary mobile station, wherein the first reverse link signal encodes reverse link communications for the communication session. The base station receives a second reverse link signal from a secondary mobile station, wherein the second reverse link signal also encodes the reverse link communications for the communication session. The base station combines the first and second reverse link signals to obtain a combined signal. The base station recovers the reverse link communications from the combined signal.

In a third principal aspect, an exemplary embodiment provides a method involving a primary mobile station and a secondary mobile station. The primary mobile station establishes a wireless communication link with the secondary mobile station. The primary mobile station transmits reverse link communications to a radio access network (RAN). The primary mobile station also transmits the reverse link communications to the secondary mobile station over the wireless communication link, wherein the secondary mobile station is configured to transmit the reverse link communications to the RAN.

DETAILED DESCRIPTION OF EXEMPLARY EMBODIMENTS

1. Introduction

Figure 1:
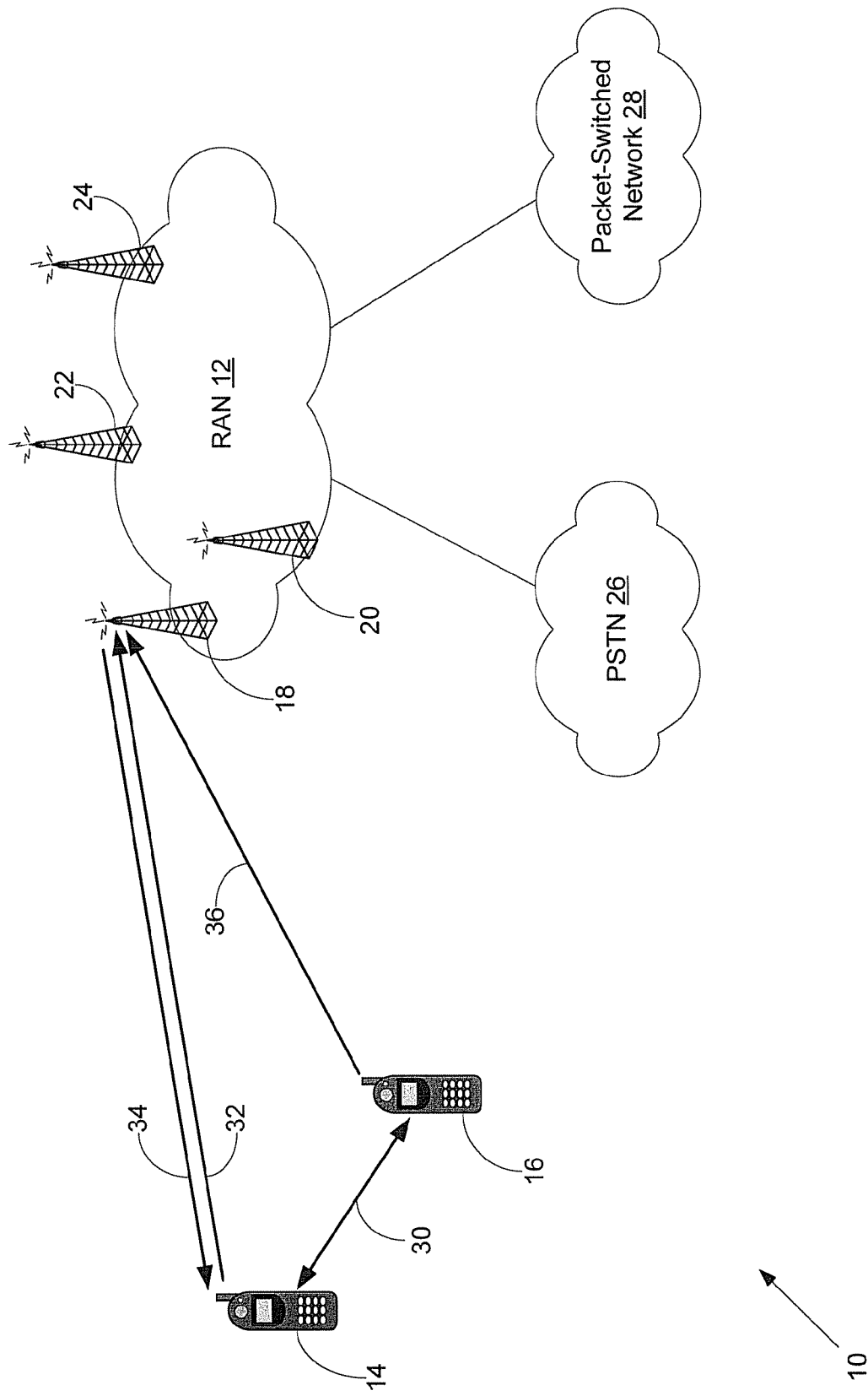
FIG. 1 is a block diagram of a configuration of a wireless telecommunications network, in accordance with an exemplary embodiment.

The inventors propose methods and systems in which multiple mobile stations transmit the same reverse link communications to a radio access network (RAN). The RAN may receive the reverse link communications from the multiple mobile stations as distinct reverse link signals, which the RAN may combine together to achieve a diversity gain. For example, a RAKE receiver in a base station may receive the reverse link communications from the multiple mobile stations as distinct reverse link signals with distinct time-shifts. Thus, different fingers of a base station's RAKE receiver may receive the same reverse link communications from different mobile stations. Alternatively, different base stations in the RAN, or different receivers within a base station, may receive the same reverse link communications from different mobile stations.

In one approach, multiple mobile stations may be used to transmit the same reverse link communications in order to improve the quality of an ongoing communication session. For example, a primary mobile station may be engaged in a communication session with an endpoint via a RAN. During the communication session, the primary mobile station may use a forward link channel to receive forward link communications from the RAN and may use a reverse link channel to transmit reverse link communications to the RAN. At some point, the mobile station and/or the RAN may detect a degradation in the quality of the communication session. In response to the degradation in quality, the primary mobile station may establish a wireless communication link with a secondary mobile station. The wireless communication link could be a short-range wireless communication link, over which the primary mobile station and the secondary mobile station communicate using a short-range wireless communication protocol, such as Bluetooth™ or IEEE 802.11.

Once the wireless communication link is established, the primary mobile station and second mobile station may transmit the same reverse link communications for the communication session. For example, the primary mobile station may transmit reverse link communications to the RAN over the reverse link channel and also transmit the same reverse link communications to the secondary mobile station over the wireless communication link. The secondary mobile station may then transmit the reverse link communications to the RAN over the reverse link channel. The RAN may receive the reverse link communications from the primary and secondary mobile stations as two distinct reverse link signals. For example, the reverse link communications from the primary and secondary mobile stations could be encoded with different pseudorandom code sequences. Alternatively, the reverse link communications from the primary and secondary mobile stations could be encoded with the same pseudorandom code sequence but received by the RAN with different time-shifts. The RAN may combine the reverse link signals from the primary and secondary mobile stations to obtain a combined signal and may recover the reverse link communications from the combined signal. In this way, the use of multiple mobile stations to transmit the same reverse link communications may achieve a diversity gain that may improve the quality of an ongoing communication session.

In another approach, multiple mobile stations may be used to request a communication session, in order to improve the chances of successfully establishing a communication session. For example, a primary mobile station may receive an instruction from a user to originate a voice or data call. The primary mobile station may determine from the current radio frequency (RF) conditions in the area that it may be difficult to establish the requested communication session. This may occur when, for example, the primary mobile station is located at the edge of a RAN's wireless coverage area. In response to this determination, the primary mobile station may establish a wireless communication link with a secondary mobile station, such as a Bluetooth™, IEEE 802.11, or other short-range wireless communication link. The primary mobile station may then request the communication session, for example, by transmitting one or more access probes in an access channel. The primary mobile station may also instruct the secondary mobile station, via the wireless communication link, to request the communication session. In response, the secondary mobile station may also transmit one or more access probes in an access channel (either the same access channel used by the primary mobile station or a different access channel). In this way, the RAN may receive a request for the communication session from either the primary mobile station or the secondary mobile station, thereby improving the chances that the RAN will receive the request.

If the RAN receives the request, the RAN may transmit a response that may be received by the primary mobile station and/or the secondary mobile station. If the secondary mobile station receives the response, the secondary mobile station may forward the response to the primary mobile station via the wireless communication link.

Once the communication session is established, the primary and secondary mobile stations may transmit the same reverse link communications for the communication session. In particular, the primary mobile station may transmit the reverse link communications to the RAN and to the secondary mobile station, via the wireless communication link, for subsequent transmission to the RAN. Thus, the RAN may receive the reverse link communications from both the primary and secondary mobile stations, so as to achieve a diversity gain.

The RAN may transmit forward link communications for the communication session over a forward link channel, which may be received by both the primary mobile station and secondary mobile station. The secondary mobile station may forward the forward link communications to the primary mobile station via the wireless communication link. Thus, the primary mobile station may receive the forward link communications from the RAN directly and via the secondary mobile station, so as to achieve a diversity gain.

By using multiple mobile stations to request communication sessions, communication sessions may be established more reliably when RF conditions are poor. By using multiple mobile stations to transmit reverse link communications and/or to receive forward link communications, the quality of an ongoing communication session may be improved.

2. Exemplary Network Architecture

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14 and mobile station 16. Mobile stations 14 and 16 could be, for example, wireless telephones, wireless personal digital assistants, wirelessly-equipped computers, or other wireless communication devices. In an exemplary embodiment, RAN 12 and mobile stations (such as mobile stations 14 and 16) communicate using a spread spectrum communication protocols, such as 1xRTT CDMA or EVDO. However, other wireless communication protocols could be used.

To support wireless communication with mobile stations, RAN 12 may include one or more base stations, exemplified in FIG. 1 by base stations 18-24. Each of base stations 18-24 has a wireless coverage area (e.g., a cell or one or more sectors) within which the base station can wirelessly communicate with one or more mobile stations. The wireless coverage areas of base stations 18-24 could be overlapping, partially overlapping, or non-overlapping.

RAN 12 may, in turn, be communicatively coupled with other networks, including one or more circuit-switched networks, such as the public switched telephone network (PSTN), and/or one or more packet-switched networks, such as the Internet. For purposes of illustration, FIG. 1 shows RAN 12 communicatively coupled with PSTN 26 and packet-switched network 28. With this configuration, RAN 12 may support communications between mobile stations, such as mobile stations 14 and 16, and one or more endpoints communicatively coupled to PSTN 26 or to packet-switched network 28. Such endpoints may include, for example, mobile stations, landline stations, voice-over-Internet Protocol (VoIP) communication devices, Web servers, e-mail servers, streaming media servers, instant messaging servers, or gaming servers.

FIG. 1 illustrates an example in which mobile stations 14 and 16 are engaged in a communication session with an endpoint (not shown) via RAN 12. The communication session could be a voice call or a data call and, thus, may involve the exchange of voice, text, video, data, or other media. In this example, mobile station 14 functions as a primary mobile station and mobile station 16 functions as a secondary mobile station that is involved in the communication session under the control of primary mobile station 14. Primary mobile station 14 and secondary mobile station 16 are communicatively coupled via a short-range wireless communication link 30, for example, using Bluetooth™ or IEEE 802.11 protocols. Primary mobile station 14 may use communication link 30 to send instructions to secondary mobile station 14 and to transmit reverse link communications to secondary mobile station 14 for subsequent transmission to RAN 12 by secondary mobile station 14. Primary mobile station 14 may also receive from secondary mobile station 16, via wireless link 30, forward link communications that secondary mobile station 16 received from RAN 12.

In some cases, primary mobile station 14 may establish communication link 30 with secondary mobile station 16 before the communication session is established. In other cases, primary mobile station 14 may establish communication link 30 with secondary mobile station 16 after the communication session has been established, e.g., in response to a degradation in quality of the communication session.

During the communication session, primary mobile station 14 transmits a reverse link signal 32 that encodes reverse link communications for the communication session (i.e., communications for the endpoint) and receives a forward link signal 34 that encodes forward link communications for the communication session (i.e., communications from the endpoint). Primary mobile station 14 also transmits the reverse link communications to secondary mobile station 16 via short-range wireless link 30. Secondary mobile station 16 then transmits a reverse link signal 36 that encodes the reverse link communications.

In the example shown in FIG. 1, reverse link signals 32 and 36 are received by the same base station in RAN, i.e., by base station 18. Thus, BTS 18 may combine reverse link signals 32 and 36 together to obtain a combined signal and recover the reverse link communications from the combined signals. In this way, a diversity gain may be achieved.

It is to be understood, however, that reverse link signals 32 and 36 could be received by different base stations in RAN 12. For example, base station 18 may receive reverse link signal 32 and base station 20 may receive reverse link signal 34. In that case, another element of RAN 12, such a base station controller or radio network controller, may combine the signals to achieve a diversity gain.

Although FIG. 1 shows an example in which multiple mobile stations transmit the reverse link communications for a communication session, it is to be understood that multiple mobile station could also receive the forward link communications for the communication session. Thus, while FIG. 1 shows primary mobile station 14 receiving forward link signal 34 that encodes the forward link communications, secondary mobile station 16 may also receive a forward link signal that encodes the forward link communications. In that case, secondary mobile station 16 may forward the forward link communications to primary mobile station 14 via wireless link 30. Primary mobile station 14 may then combine the forward link communications received in forward link signal 34 and the forward link communications received from secondary mobile station 16 to achieve a diversity gain.

In this way, the involvement of multiple mobile stations in a communication session may be used to achieve a diversity gain for the reverse link and/or forward link. Moreover, although FIG. 1 shows the involvement of only one secondary mobile station (i.e., mobile station 16), it is to be understood that a primary mobile station may involve more than one secondary mobile station in a communication session (e.g., using more than one short-range wireless communication link) to achieve even more diversity gain.

3. Exemplary Methods

Figure 2:
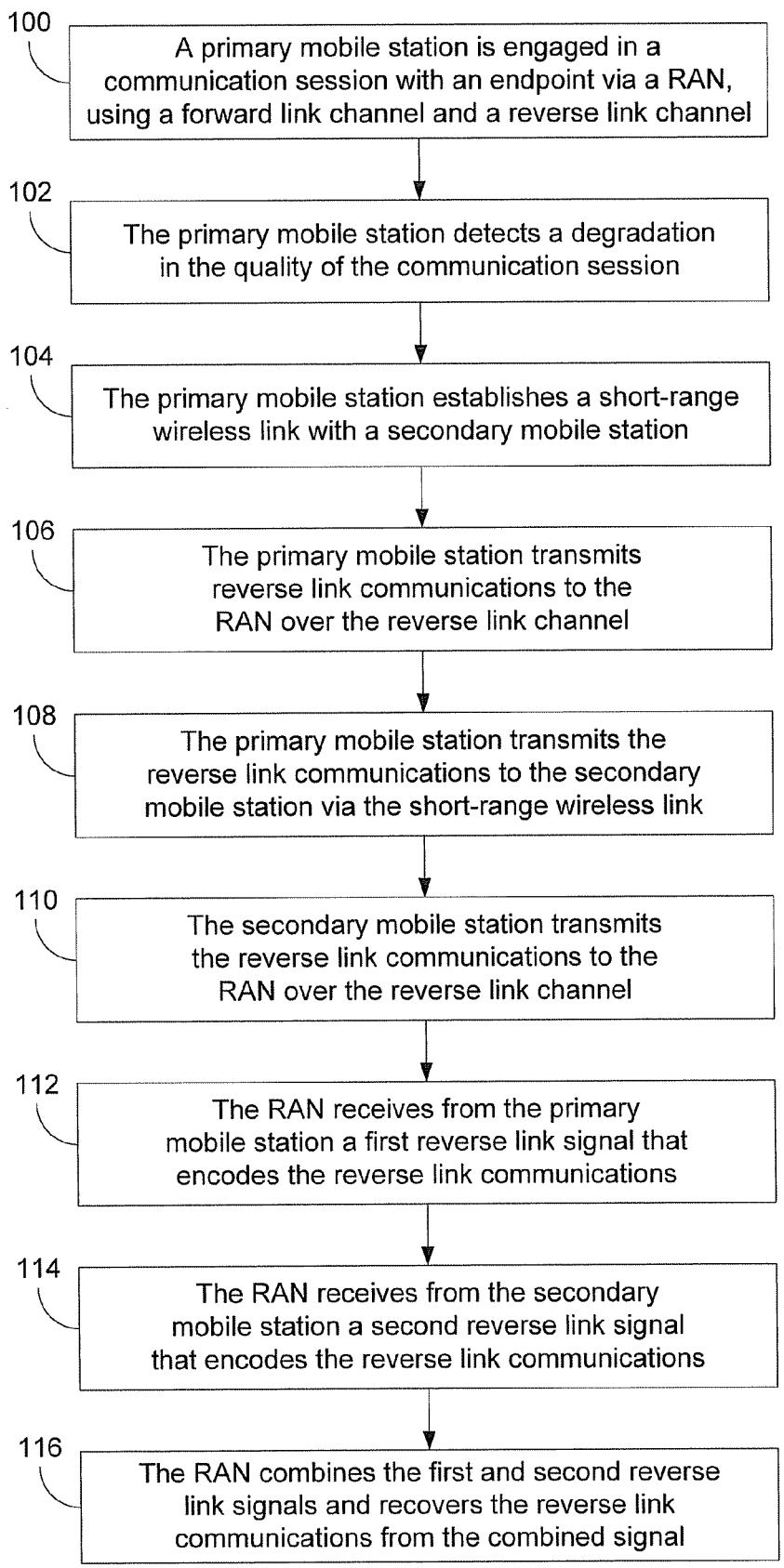
FIG. 2 is flow chart illustrating a first method, in accordance with an exemplary embodiment.

FIG. 2 is a flow chart illustrating an exemplary method for using a secondary mobile station to improve the quality of a communication session. For purposes of illustration, FIG. 2 is described with reference to the configurations shown in FIG. 1. It is to be understood, however, that other configurations could be used.

In the example of FIG. 2, a primary mobile station (e.g., mobile station 14) is engaged in a communication session with an endpoint via a RAN (e.g., RAN 12), as indicated by block 100. The communication session could be, for example, a voice call or a data call. During the communication session, the primary mobile station uses a reverse link channel to transmit a reverse link signal that encodes reverse link communications for the endpoint and uses a forward link channel to receive a forward link signal that encodes forward link communications from the endpoint. A particular base station in the RAN (e.g., base station 18) may transmit the forward link signal and receive the reverse link signal.

At some point, the primary mobile station detects a degradation in the quality of the communication session, as indicated by block 102. The primary mobile station may detect the degradation in quality, for example, when an error rate (such as a frame error rate) in the forward link signal exceeds a threshold value or when a signal-to-noise ratio of the forward link signal falls below a threshold value. The primary mobile station might also detect a degradation in quality when the primary mobile station has increased the power level at which it transmits the reverse link signal to a maximum level or when the base station has increased the power level at which it transmits the forward link signal to a maximum level. It is to be understood that these criteria for detecting a degradation of quality are exemplary only, as the primary mobile station could use other criteria. In addition, it is to be understood that the RAN may also be involved in detecting a degradation in quality of the communication. For example, the RAN may notify the primary mobile station when the RAN has detected a degradation in quality.

In response to the degradation in quality, the primary mobile station establishes a short-range wireless communication link with a secondary mobile station, as indicated by block 104. In an exemplary embodiment, the primary mobile station uses a short-range wireless communication protocol, such as Bluetooth™ or IEEE 802.11, to establish the short-range wireless link. In addition to being to communicate using the protocol used for the short-range wireless link, the secondary mobile station also has an application that allows it to operate under the control of the primary mobile station.

Once the short-range wireless communication link is established, the primary mobile station continues the communication session using the secondary mobile station. In this regard, the primary mobile station transmits the reverse link communications for the communication session to the RAN over the reverse link channel (as indicated by block 106) and also transmits the reverse link communications to the secondary mobile station via the short-range wireless link (as indicated by block 108). The secondary mobile station then transmits the reverse link communications to the RAN over the reverse link channel, as indicated by block 110.

The RAN may receive the reverse link communications transmitted by the primary and secondary mobile stations as distinct reverse link signals. In this regard, the RAN may receive from the primary mobile station a first reverse link signal that encodes the reverse link communications (as indicated by block 112) and may receive from the secondary mobile station a second reverse link signal that encodes the reverse link communications (as indicated by block 114). The RAN combines the first and second reverse link signal and recovers the reverse link communications from the combined signal, as indicated by block 116.

The first and second reverse link signals could be encoded in the same way or they could be differently encoded. In an exemplary embodiment, the first reverse link signal is encoded using a pseudorandom code sequence that is generated using an identifier of the primary mobile station, such as the primary mobile station's electronic serial number (ESN). The primary mobile station may transmit this identifier to the secondary mobile station over the short-range wireless link, and the secondary mobile station may use the identifier to generate the same pseudorandom code sequence as generated by the primary mobile station. The secondary mobile station may then use the pseudorandom code sequence to encode the second reverse link signal. In this way, the first and second reverse link signals may be encoded with the same pseudorandom code sequence.

A base station in the RAN may receive the first and second reverse link signals with different time-shifts due to different propagation delays. However, because they are encoded with the same pseudorandom code sequence, the receiving base station may treat the first and second reverse link signals as multipath components of the same reverse link signal. For example, the first and second reverse link signals may be received by different fingers of a RAKE receiver in the base station and then combined.

Alternatively, the first and second reverse link signals may be differently encoded. For example, the primary mobile station may encode the first reverse link signal with a pseudorandom code sequence generated from the primary mobile station's ESN and the secondary mobile station may encode the second reverse link signal with a pseudorandom code sequence generated from the secondary mobile station's ESN. In order for the RAN to recognize the first and second reverse link signals as related, the primary mobile station may inform the RAN of the secondary mobile station's ESN.

FIG. 2 illustrates an example in which a primary mobile station uses a secondary mobile station to continue an ongoing communication session. However, a primary mobile station may also use a secondary mobile station to establish a communication session, for example, as illustrated in FIG. 3.

Figure 3:
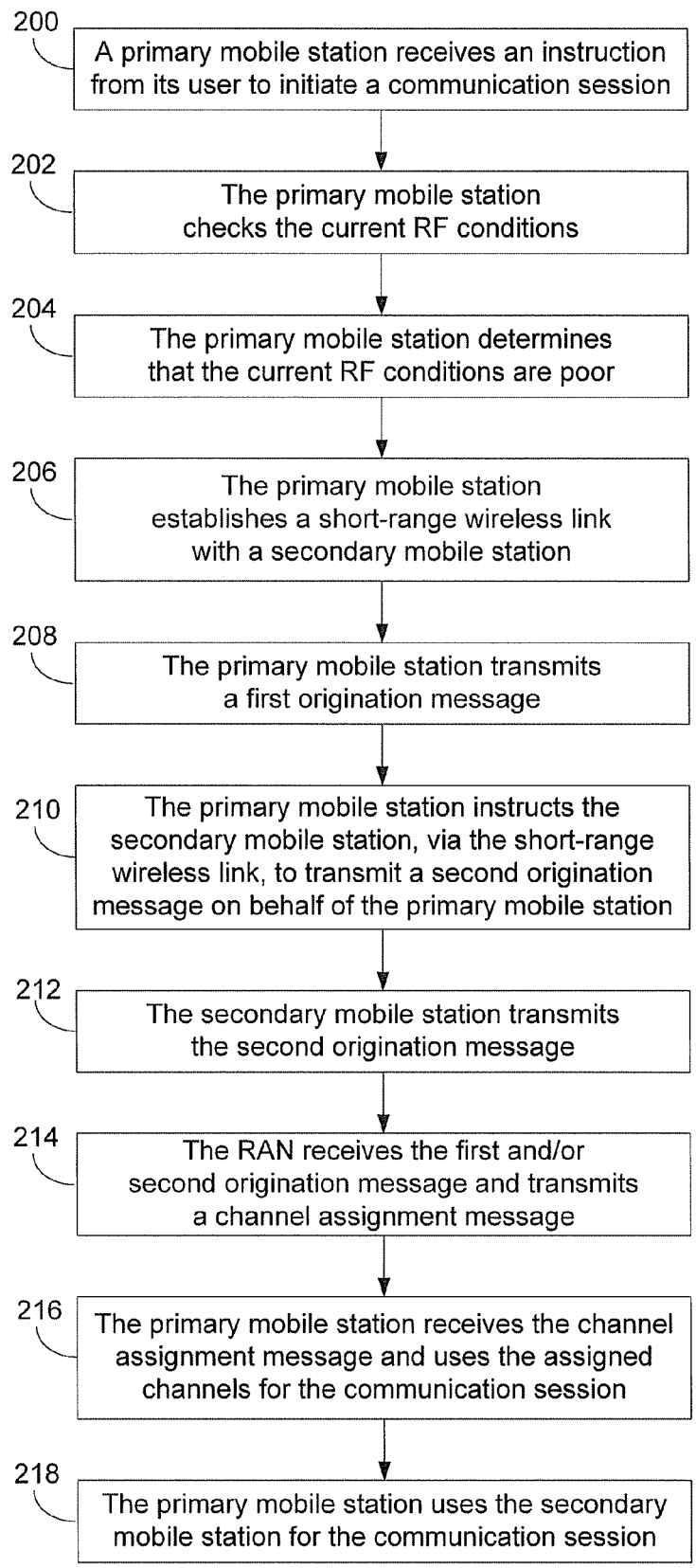
FIG. 3 is flow chart illustrating a second method, in accordance with an exemplary embodiment.

With reference to FIG. 3, the process may begin when a primary mobile station receives an instruction from its user to initiate a communication session, as indicated by block 200. The communication session could be, for example, a voice call or a data call.

Before the primary mobile station begins the process of requesting the communication session, the primary mobile station may check the current radio frequency (RF) conditions at its location, as indicated by block 202. The primary mobile station may do this, for example, by measuring the signal strength of a pilot signal transmitted by its current base station or sector and/or signal strengths of pilot signals transmitted by other base stations or sectors in the RAN. Alternatively, the primary mobile station may rely on one or more recently-obtained signal strength measurements, rather than performing a signal strength measurement in response to the user's instruction to initiate a communication session.

In this example, the primary mobile station determines that the current RF conditions are poor, as indicated by block 204. The poor RF conditions may be insufficient for the primary mobile station to initiate the communication session reliably and/or insufficient to support a communication session at an acceptable level of quality. The primary mobile station may determine that the current RF conditions are poor when the signal strength of the RAN measured by the primary mobile station is below a threshold value, or based on other criteria. In response to this determination, the primary mobile station establishes a short-range wireless link with a secondary mobile station, as indicated by block 206.

Once the short-range wireless link is established, the primary mobile station may use the second mobile station in order to help the primary mobile station request the communication session. In particular, the primary mobile station may transmit a first origination message, as indicated by block 208. The first origination message may request the communication session requested by the user and may identify the primary mobile station as the requestor. The primary mobile station may transmit the first origination message as one or more access probes in an access channel of the RAN. In addition, the primary mobile station may instruct the secondary mobile station, via the short-range wireless link, to transmit a second origination message on behalf of the primary mobile station, as indicated by block 210. For example, the primary mobile station may instruct the secondary mobile station to transmit the same or similar origination message as transmitted by the primary mobile station, i.e., requesting the same communication session and identifying the primary mobile station as the requestor.

In response, the secondary mobile station transmits the second origination message in accordance with the primary mobile station's instructions, as indicated by block 212. The secondary mobile station may transmit the second origination message as one or more access probes in an access channel of the RAN (either the same access channel that the primary mobile station used for the first origination message, or a different access channel).

The RAN may receive the first and/or second origination message and responsively transmit a channel assignment message, as indicated by block 214. The channel assignment message may assign a forward link channel and a reverse link channel for the communication session (e.g., forward and reverse traffic channels). The primary mobile station may receive the channel assignment message and then use the assigned channels for the communication session, as indicated by block 216. For example, the primary mobile station may use the assigned forward link channel to receive forward link communications for the communication session and may use the assigned reverse link channel to transmit reverse link communications for the communication session.

The primary mobile station may also use the secondary mobile station for the communication session, as indicated by block 218. For example, the primary mobile station may instruct the secondary mobile station, via the short-range wireless link, to transmit the same reverse link communications that the primary mobile station transmits in the assigned reverse link channel. The primary mobile station may also instruct the secondary mobile station to receive the forward link communications that the RAN transmits in the assigned forward link channel and to forward the forward link communications to the primary mobile station via the short-range wireless communication link.

By using the secondary mobile station to transmit the same type of origination message as transmitted by the primary mobile station, the primary mobile station may beneficially improve the chances of establishing the requested the communication session when RF conditions are poor. Once the communication has been established, the primary mobile station may use the secondary mobile station to achieve a diversity gain for the forward link and/or reverse link, thereby improving the quality of the communication session.

4. Exemplary Mobile Station

Figure 4:
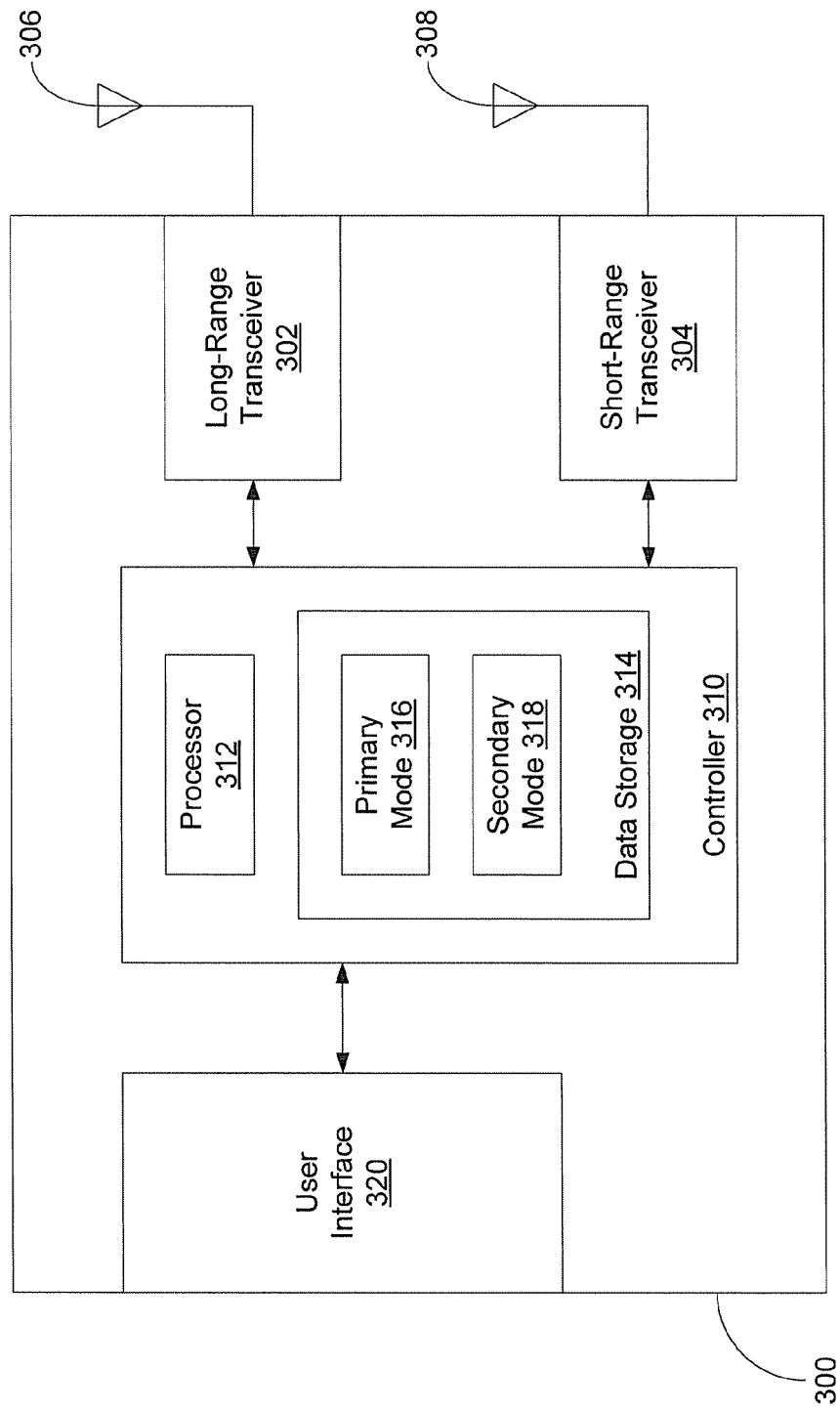
FIG. 4 is a block diagram of a mobile station, in accordance with an exemplary embodiment.

FIG. 4 illustrates an exemplary mobile station 300 that may function as either a primary mobile station or a secondary mobile station, for example, in accordance with the methods described above and illustrated in FIGS. 2 and 3. Mobile station 300 includes a long-range transceiver 302 and a short-range transceiver 304. Long-range transceiver 302 is configured to transmit and receive RF signals, via an antenna 306, in accordance with a long-range wireless communications protocol, such as 1 xRTT CDMA, EVDO, GSM/GPRS, IEEE 802.16 (WiMAX), or LTE. Short-range transceiver 304 is configured to transmit and receive RF signals, via an antenna 308, in accordance with a short-range wireless communications protocol, such as Bluetooth™ or IEEE 802.11.

The functioning of long-range transceiver 302 and short-range transceiver 304 may be controlled by a controller 310. Controller 310 may be implemented as hardware, software, and/or firmware. In an exemplary embodiment, controller 310 includes a processor 312 and data storage 314. Data storage 314 may include volatile and/or non-volatile memory. Data storage 314 may store software instructions that when executed by processor 312 control the functioning of mobile station 300. In this regard, data storage 314 may store primary mode instructions 316 that enable mobile station 300 to function as a primary mobile station. Data storage 314 may also store secondary mode instructions 318 that enable mobile station 300 to function as a secondary mobile station.

When operating as a primary mobile station, mobile station 300 may use long-range transceiver 302 to communicate with a RAN and may use short-range transceiver 304 to communicate with one or more secondary mobile stations, e.g., as described above for FIGS. 2 and 3. For example, primary mode instructions 316 may enable mobile station 300 to locate one or more secondary mobile stations using short-range transceiver 304 and to establish short-range wireless communications links with them. Once a short-range wireless communication link is established with a secondary mobile station, primary mode instructions 316 may enable mobile station 300 to control the secondary mobile station via the short-range wireless link, for example, to use the secondary mobile station to continue an ongoing communication session or to initiate a new communication session.

When operating as a secondary mobile station, mobile station 300 may use short-range transceiver 304 to communicate with the primary mobile station and may use long-range transceiver 302 to communicate with the RAN as instructed by the primary mobile station, e.g., as described above for FIGS. 2 and 3. For example, secondary mode instructions 318 may enable mobile station 300 to establish a short-range wireless communication link requested by a primary mobile station. Once the short-range wireless communication link is established, secondary mode instructions 318 may enable mobile station 300 to receive instructions from the primary mobile station, to receive reverse link communications from the primary mobile station for subsequent transmission by long-range transceiver 302, and/or to forward to the primary mobile station forward link communications received by long-range transceiver 302.

In this way, mobile station 300 may be able to function as either a primary mobile station or a secondary mobile station, depending on the situation. It is to be understood, however, that a mobile station could be configured with only primary mode instructions so that the mobile station is able to function as a primary mobile station but not a secondary mobile station. Alternatively, a mobile station could be configured with only secondary mode instructions so that the mobile station is able to function as a secondary mobile station but not a primary mobile station.

Mobile station 300 may include a user interface 320 that allows a user to interact with mobile station 300. User interface 320 may include a speaker and microphone that allow mobile station 300 to receive audio from the user and to convey audio to the user, for example, when mobile station 300 is involved in a voice call. User interface 320 may also include a display screen for displaying text, graphics, video or other visual information to the user and may include one or more input devices, such as a keypad, buttons, or touch screen, to receive input from the user. User interface 320 may be coupled to controller 310 so that user instructions received through user interface 320 may control the operation of mobile station 300.

User interface 320 may serve different functions depending on whether mobile station 300 is functioning as a primary mobile station or a secondary mobile station. For example, if mobile station 300 is functioning as a primary mobile station in a communication session with an endpoint, user interface 320 may receive voice, text, graphics, video, or other media from the user that is then transmitted to the endpoint. Similarly, voice, text, graphics, video, or other media from the endpoint may be conveyed to the user through user interface 320.

On the other hand, if mobile station 300 is functioning as a secondary mobile station in a communication session, user interface 320 might be separated from the voice, text, graphics, video, or other media that is transferred between the primary mobile station and endpoint during the communication session. In other words, when functioning as a secondary mobile station, mobile station 300 may support the communication session on behalf of the primary mobile station without involving the secondary mobile station's user. User interface 320 may, however, indicate to the user that mobile station 300 is supporting a communication session on behalf of another mobile station. In addition, user interface 320 may allow the user to accept or reject a request from a primary mobile station to have mobile station 300 function as a secondary mobile station.

5. Conclusion

Exemplary embodiments of the present invention have been described above. Those skilled in the art will understand, however, that changes and modifications may be made to these embodiments without departing from the true scope and spirit of the invention, which is defined by the claims.

The invention claimed is:

1. A method, comprising:
a primary mobile station engaging in a communication session via a radio access network (RAN), wherein said primary mobile station uses a forward link channel to receive communications from said RAN and uses a reverse link channel to transmit communications to said RAN, said primary mobile station including a long-range transceiver configured to transmit and receive wireless signals in accordance with a long-range wireless communication protocol and a short-range transceiver configured to transmit and receive wireless signals in accordance with a short-range wireless communication protocol, said primary mobile station using said longrange transceiver to communicate with said RAN over said forward and reverse link channels;
in response to a degradation in quality of said communication session, said primary mobile station using said short-range transceiver to establish at least one wireless communication link with at least one secondary mobile station; and
said primary mobile station continuing said communication session using said at least one secondary mobile station,
wherein said primary mobile station continuing said communication session using said at least one secondary mobile station comprises said primary mobile station using said long-range transceiver to transmit reverse link communications to said RAN over said reverse link channel and said primary mobile station using said short-range transceiver to transmit said reverse link communications to said at least one secondary mobile station over said at least one wireless communication link, wherein said at least one secondary mobile station is configured to transmit said reverse link communications to said RAN.

2. The method of claim 1, wherein said primary mobile station using said long-range transceiver to transmit reverse link communications to said RAN over said reverse link channel comprises:
said primary mobile station transmitting said reverse link communications encoded with a primary-device code, wherein said primary-device code is generated using an identifier of said primary mobile station.

3. The method of claim 2, further comprising: said at least one secondary mobile station transmitting said reverse link communications to said RAN over said reverse link channel.

4. The method of claim 3, wherein said at least one secondary mobile station transmitting said reverse link communications to said RAN over said reverse link channel comprises:
said at least one secondary mobile station transmitting said reverse link communications encoded with said primary-device code.

5. The method of claim 4, further comprising: said primary mobile station communicating said identifier of said primary mobile station to said at least one secondary mobile station over said at least one wireless communication link.

6. The method of claim 3, wherein said at least one secondary mobile station transmitting said reverse link communications to said RAN over said reverse link channel comprises:
said at least one secondary mobile station transmitting said reverse link communications encoded with a secondary-device code, wherein said secondary-device code is generated using an identifier of said at least one secondary mobile station.

7. The method of claim 6, further comprising: said primary mobile station communicating said identifier of said at least one secondary mobile station to said RAN.

8. The method of claim 1, further comprising: said primary mobile station detecting said degradation in quality of said communication session.

9. The method of claim 1, further comprising:
said RAN detecting said degradation in quality of said communication session; and
said RAN transmitting an indication of said degradation in quality to said primary mobile station.

10. A method, comprising:
a primary mobile station receiving an instruction to initiate a communication session;
said primary mobile station measuring a signal strength of a radio access network (RAN);
said primary mobile station making a determination that said measured signal strength is below a threshold value;
in response to said determination, said primary mobile station establishing a wireless communication link with a secondary mobile station for said communication session, wherein said primary mobile station includes a long-range transceiver configured to transmit and receive wireless signals in accordance with a long-range wireless communication protocol and a short range transceiver configured to transmit and receive wireless signals in accordance with a short range wireless communication protocol; and
during said communication session:
said primary mobile station using said long-range transceiver to transmit reverse link communications to said RAN; and
said primary mobile station using said short-range transceiver to transmit said reverse link communications to said secondary mobile station over said wireless communication link, wherein said secondary mobile station is configured to transmit said reverse link communications to said RAN;
said primary mobile station receiving forward link communications from said RAN; and
said primary mobile station receiving said forward link communications from said secondary mobile station over said wireless communication link.

11. The method of claim 10, further comprising:
said primary mobile station transmitting to said RAN a first message requesting said communication session; and
said primary mobile station using said wireless communication link to instruct said secondary mobile station to transmit to said RAN a second message requesting said communication session.

* * * * *